United States Patent
Sumigama et al.

(10) Patent No.: US 11,635,413 B2
(45) Date of Patent: Apr. 25, 2023

(54) LIQUID CHROMATOGRAPH MASS SPECTROMETER

(71) Applicant: HITACHI HIGH-TECH CORPORATION, Tokyo (JP)

(72) Inventors: Yuka Sumigama, Tokyo (JP); Yuichiro Hashimoto, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 140 days.

(21) Appl. No.: 17/424,526

(22) PCT Filed: Feb. 4, 2020

(86) PCT No.: PCT/JP2020/004067
§ 371 (c)(1),
(2) Date: Jul. 21, 2021

(87) PCT Pub. No.: WO2020/162438
PCT Pub. Date: Aug. 13, 2020

(65) Prior Publication Data
US 2022/0074901 A1    Mar. 10, 2022

(30) Foreign Application Priority Data
Feb. 4, 2019  (JP) .............................. JP2019-018250

(51) Int. Cl.
*G01N 30/38*     (2006.01)
*G01N 30/72*     (2006.01)
(Continued)

(52) U.S. Cl.
CPC ......... *G01N 30/7233* (2013.01); *G01N 30/38* (2013.01); *G01N 2030/027* (2013.01); *G01N 2030/326* (2013.01)

(58) Field of Classification Search
CPC ............... G01N 30/7233; G01N 30/38; G01N 2030/027; G01N 2030/326; G01N 30/62;
(Continued)

(56) References Cited

U.S. PATENT DOCUMENTS 5,585,070 A * 12/1996 Lessard .................. G01N 30/06
422/70
5,703,360 A   12/1997 Fischer et al.
(Continued)

FOREIGN PATENT DOCUMENTS

JP    2003215102 A    7/2003
JP    2008014788 A    1/2008
(Continued)

OTHER PUBLICATIONS

International Search Report of PCT/JP2020/004067 dated Apr. 14, 2020.
(Continued)

*Primary Examiner* — David J Bolduc
(74) *Attorney, Agent, or Firm* — Mattingly & Malur, PC

(57) ABSTRACT

The invention provides a liquid chromatograph mass spectrometer which prevents contamination of a pump and a column and can perform mass calibration without adding a complicated mechanism. This liquid chromatograph mass spectrometer includes a liquid chromatograph including a liquid feed pump configured to feed a mobile phase solvent, a mass spectrometer configured to analyze a mass of a sample, and a standard sample container configured to be connected in series with the liquid chromatograph and the mass spectrometer in a flow path that connects the liquid chromatograph and the mass spectrometer and configured to house a standard sample for mass calibration.

8 Claims, 13 Drawing Sheets

(51) Int. Cl.
*G01N 30/02* (2006.01)
*G01N 30/32* (2006.01)

(58) Field of Classification Search
CPC ............. G01N 30/46; G01N 2030/625; G01N 2030/626
See application file for complete search history.

(56) References Cited

U.S. PATENT DOCUMENTS

| | | | | |
|---|---|---|---|---|
| 5,789,746 | A * | 8/1998 | Kato | G01N 30/7233 250/288 |
| 2002/0011096 | A1* | 1/2002 | Johnson | G01N 30/96 73/61.52 |
| 2011/0114833 | A1 | 5/2011 | Jiang et al. | |
| 2013/0206653 | A1* | 8/2013 | Brann | B01L 3/545 210/198.2 |
| 2015/0072360 | A1* | 3/2015 | Everett | H01J 49/0027 435/7.92 |
| 2015/0377842 | A1* | 12/2015 | Ozbal | G01N 33/491 250/288 |
| 2017/0059580 | A1* | 3/2017 | Ozbal | G01N 35/1097 |
| 2017/0176471 | A1* | 6/2017 | Moon | G01N 33/92 |
| 2018/0218892 | A1 | 8/2018 | Yamaguchi et al. | |
| 2019/0170712 | A1* | 6/2019 | Ueda | G01N 30/72 |
| 2020/0333369 | A1* | 10/2020 | Toyoda | G01N 1/28 |

FOREIGN PATENT DOCUMENTS

| | | |
|---|---|---|
| JP | 2009031201 A | 2/2009 |
| JP | 2017129459 A | 7/2017 |
| WO | 2014/068786 A1 | 5/2014 |
| WO | 2016/103388 A1 | 6/2016 |

OTHER PUBLICATIONS

Extended European Search Report received in corresponding European Application No. 20752632.8 dated Sep. 28, 2022.

* cited by examiner

[FIG. 1]
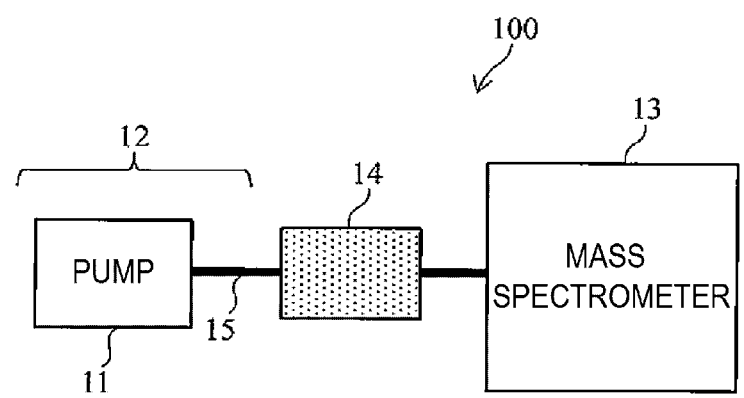

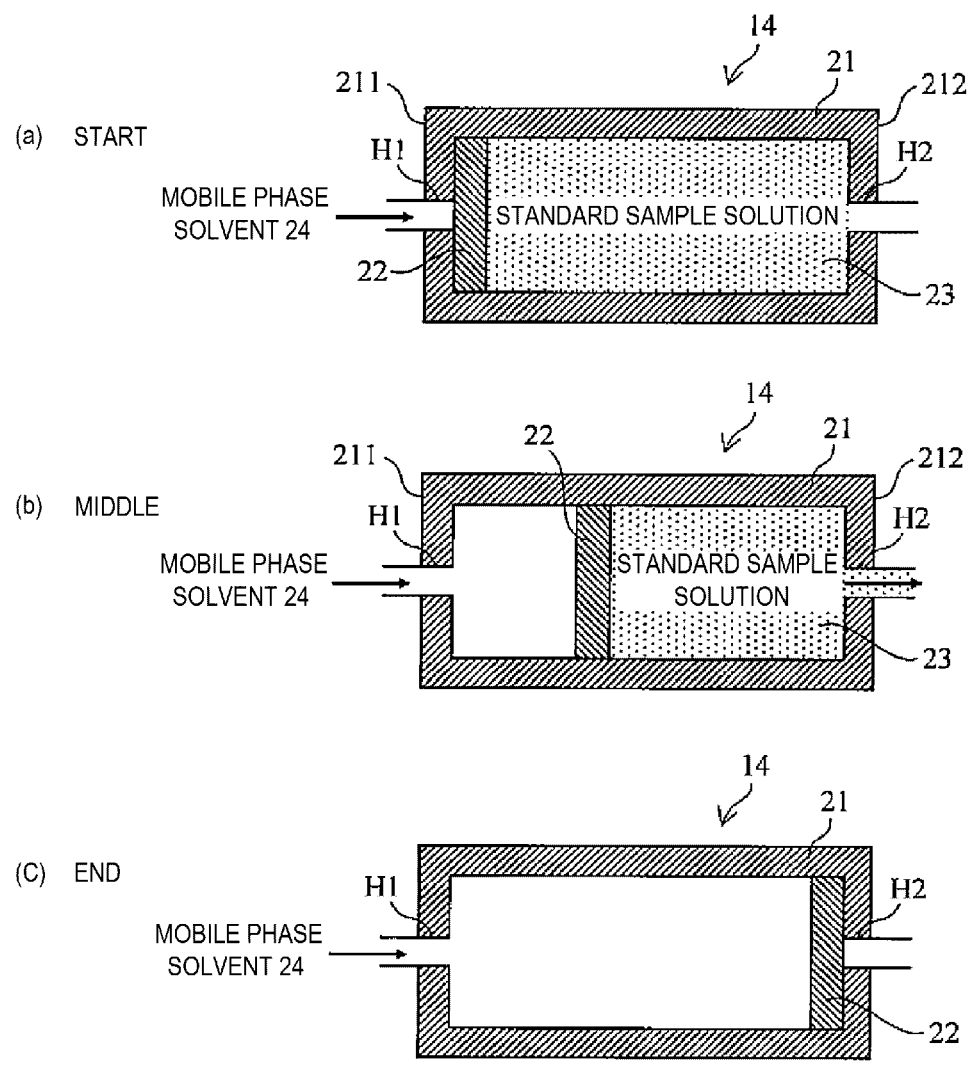

[FIG. 3]
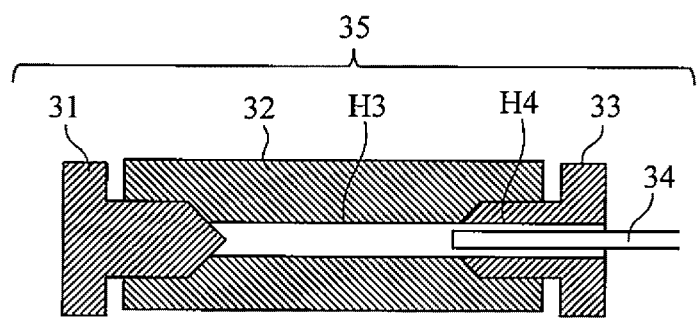

[FIG. 4]
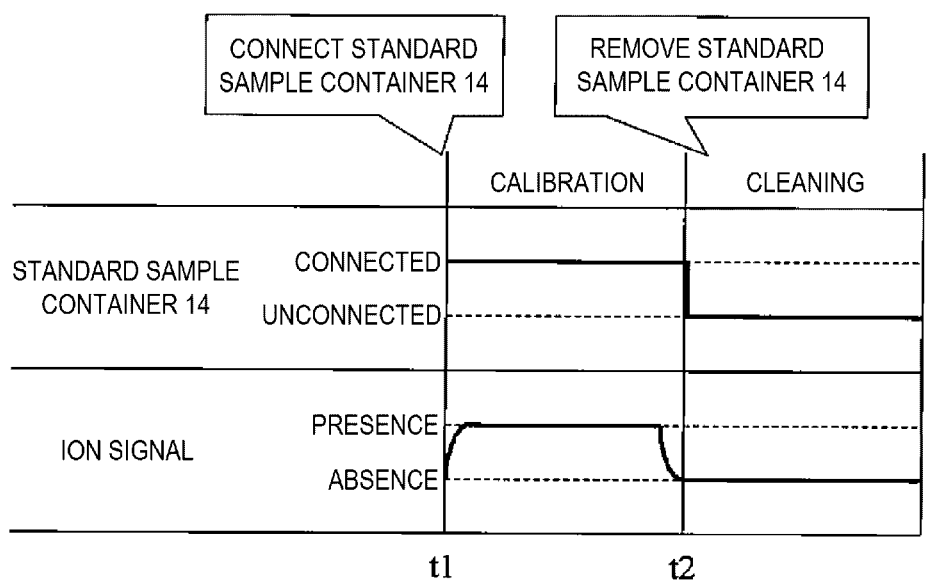

[FIG. 5]
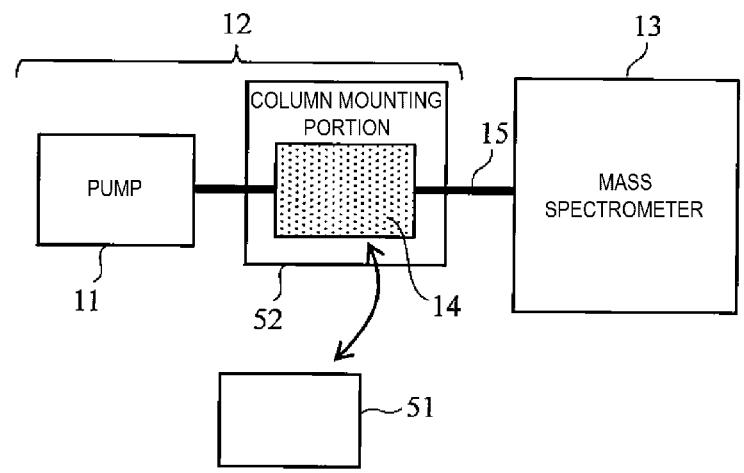

[FIG. 6]
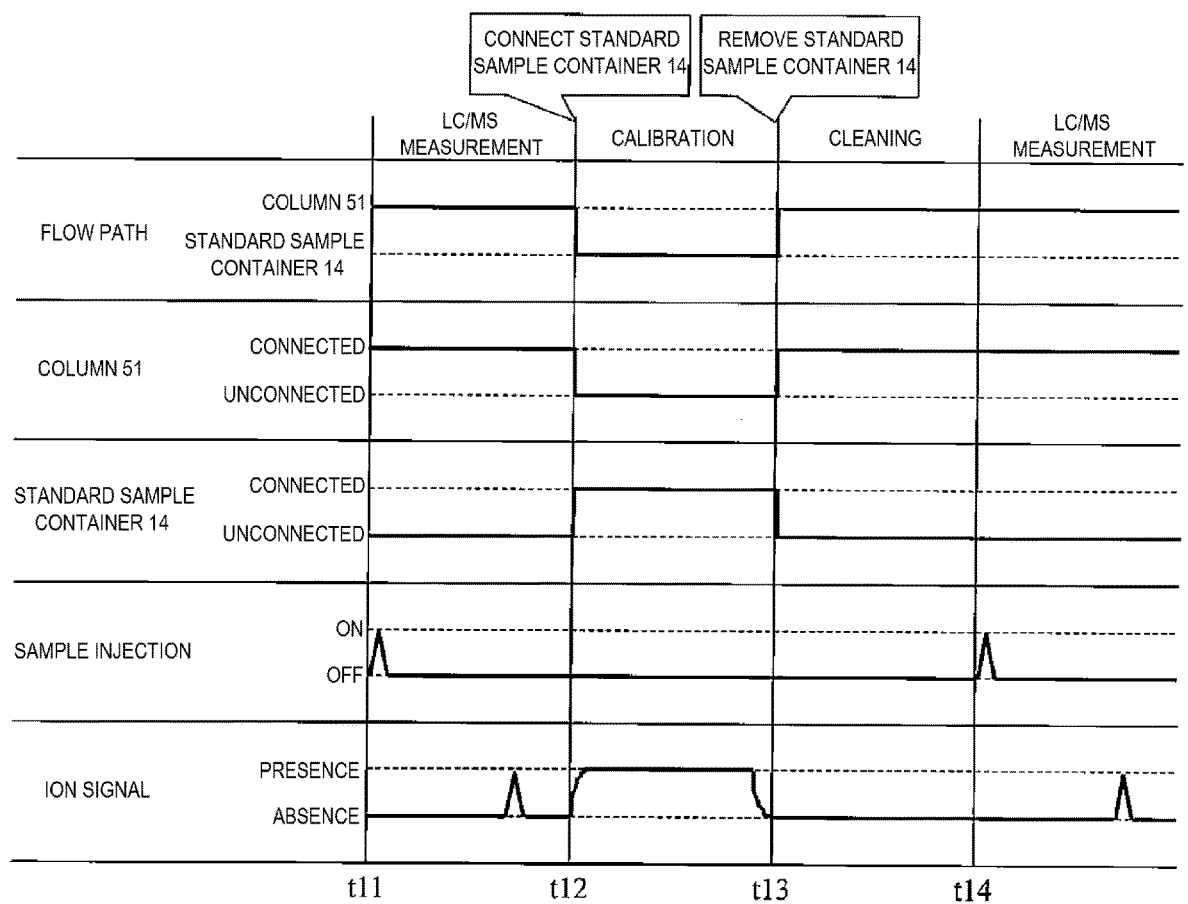

[FIG. 7]
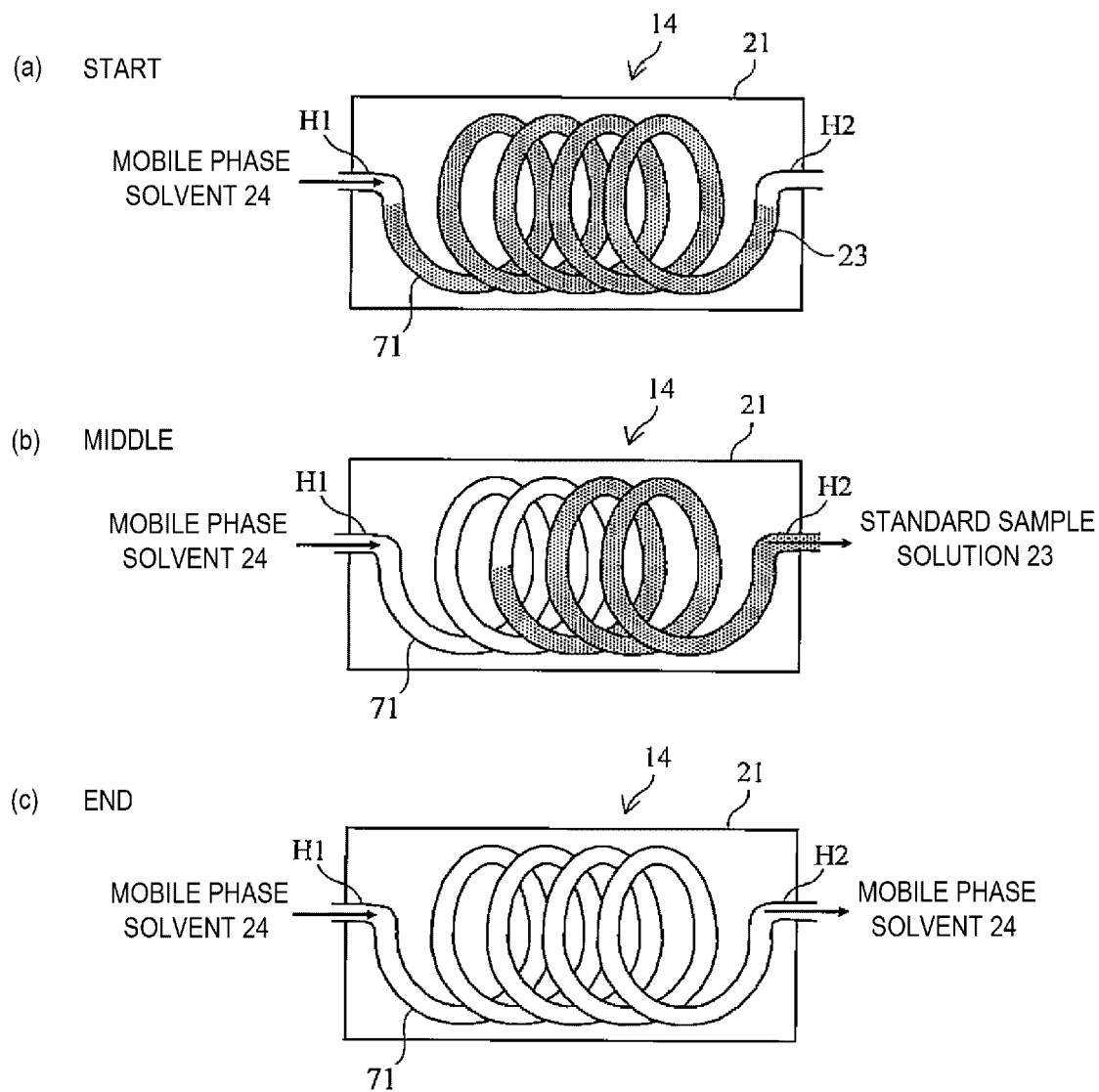

[FIG. 8]
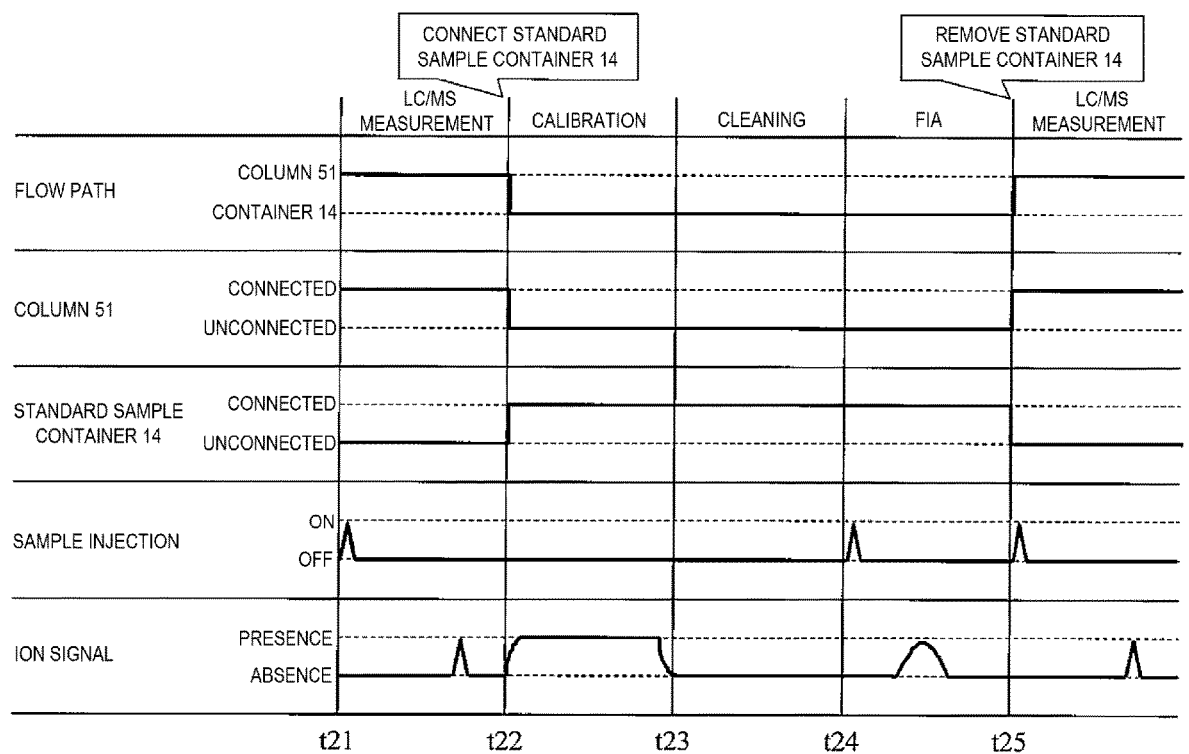

[FIG. 9]
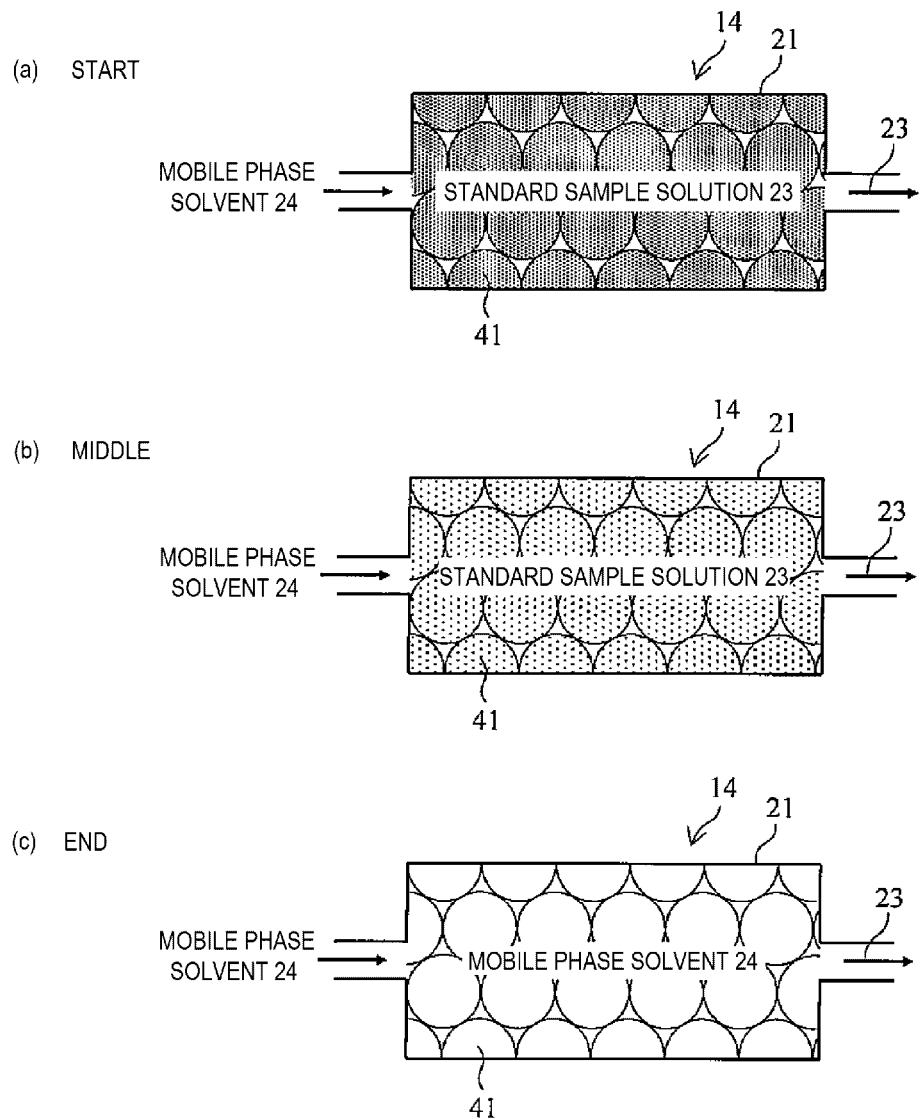

[FIG. 10]
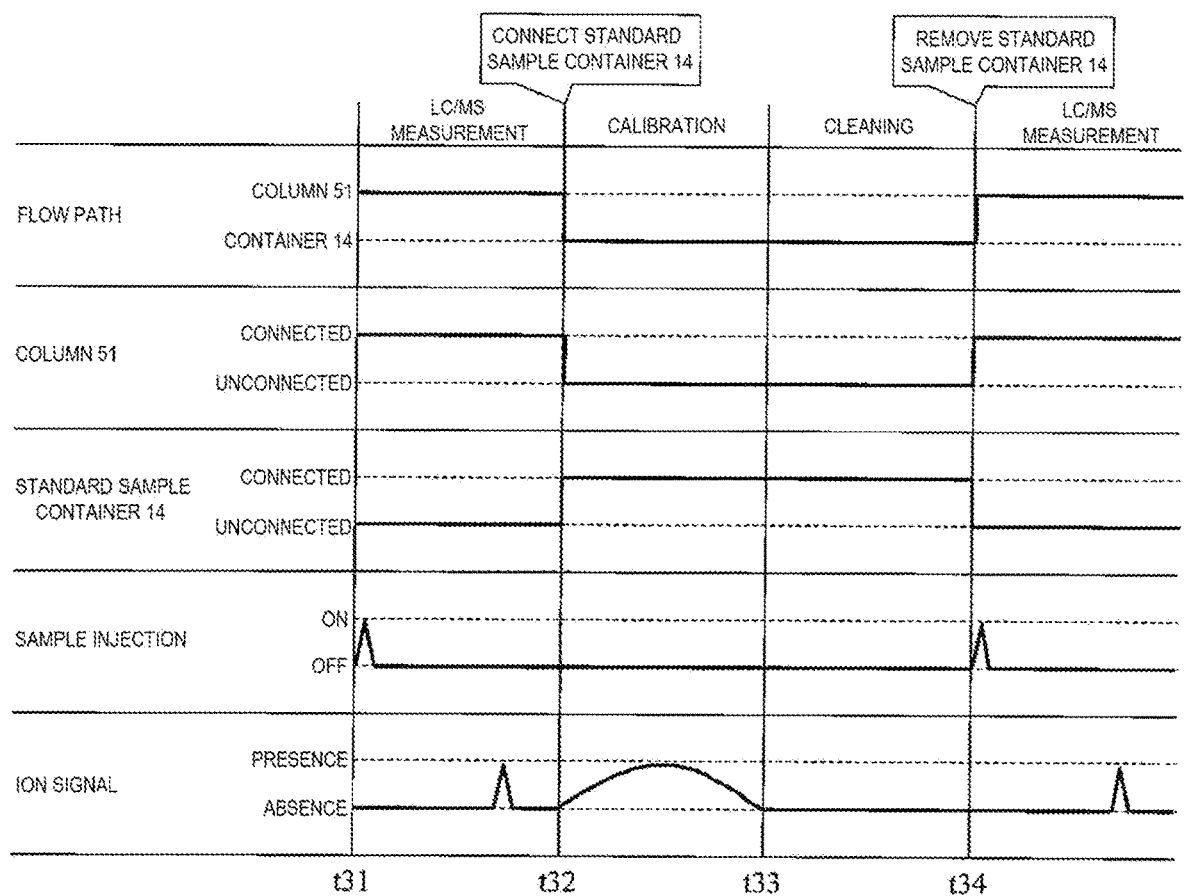

[FIG. 11]
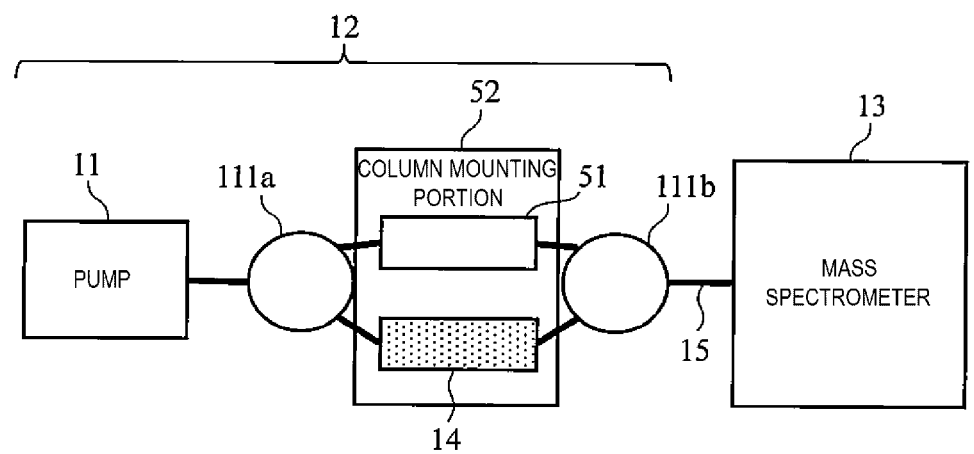

[FIG. 12]
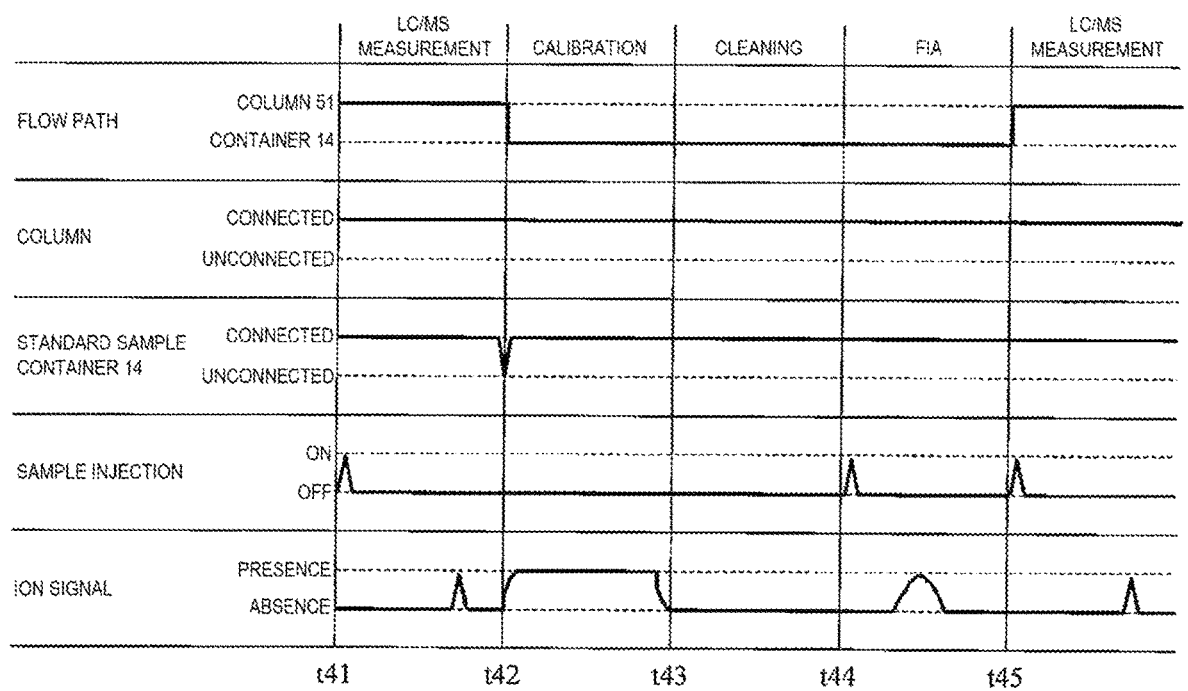

[FIG. 13]
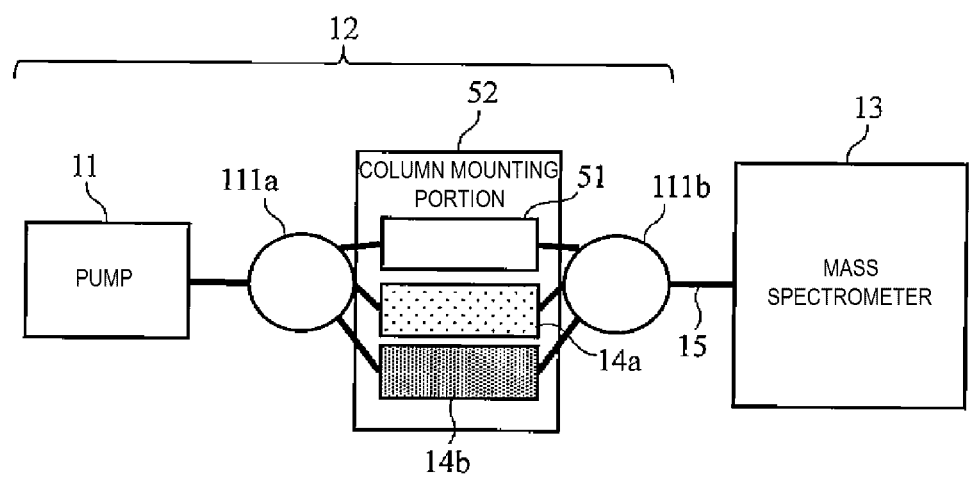

LIQUID CHROMATOGRAPH MASS SPECTROMETER

TECHNICAL FIELD

The present invention relates to a liquid chromatograph mass spectrometer.

BACKGROUND ART

A mass spectrometer is an analyzer that separates ions according to a mass-to-charge ratio by electrical and magnetic action and measures an abundance thereof. There are various separation methods such as a quadrupole type, a time-of-flight type, anion trap type, or the like, and in any one of the methods, main purpose of using the analyzer is to perform qualitative analysis of a sample containing an unknown component or quantitative analysis of a sample with unknown concentration.

When the qualitative analysis is performed, amass spectrum is acquired, in which a horizontal axis represents amass-to-charge ratio and a vertical axis represents an ion intensity. A mass number of an unknown sample and a structure thereof are inferred from a pattern of an ion peak in the mass spectrum. When the quantitative analysis is performed, the ion intensity at the mass-to-charge ratio specific to a substance to be quantified is measured for several minutes. By performing this measurement, a mass chromatogram in which a horizontal axis represents time and a vertical axis represents an ion intensity is acquired. Concentration of the unknown sample is calculated by obtaining a ratio of an area of a chromatogram of the unknown sample to an area of a chromatogram of a sample with known concentration.

The mass spectrometer is often used in association with a chromatograph. The chromatograph is a device that separates a component in a mixture by using intensity of chemical or physical interaction. Examples of the chromatograph include a gas chromatograph in which a mobile phase is a gas, a liquid chromatograph in which the mobile phase is a liquid, or the like. Accuracy of the qualitative analysis and the quantitative analysis is improved by separating an impurity component from a sample with the chromatograph and then performing analysis on the sample with the mass spectrometer. When the chromatogram is used, an ion signal appears in a peak shape in the chromatogram of an analysis result of the mass spectrometer.

Here, in any one of the qualitative analysis and quantitative analysis, an important point for maintaining the measurement accuracy is a peak location of the ion signal in a horizontal axis direction in the mass spectrum. The peak location of the ion signal is determined by values of electrical and magnetic forces applied to the mass spectrometer. The values of these forces are susceptible to an influence of a change in temperature and humidity around a device. Therefore, the peak location of the ion signal changes depending on the change in the temperature and humidity therearound, which results in a difference from a true mass-to-charge ratio. When the difference therefrom is significantly large, the qualitative analysis cannot identify what a sample to be measured is. In the quantitative analysis, there is a problem that a peak of an ion signal of a substance to be measured in the chromatogram cannot be seen.

For the reasons described above, normally, before the mass spectrometer is used, a standard sample including the known mass number is measured to obtain the mass spectrum, and the horizontal axis of the mass spectrum is corrected based on the peak location of the ion signal. This operation is referred to as mass calibration or mass correction. In order to perform the mass calibration accurately, it is required to measure the ion signal of the standard sample for a certain period of time in a state where a sufficient amount of signals are maintained.

JP-A-2009-31201 (PTL 1) 1 is a literature relating to such a mass calibration method. In this literature, an internal standard sample including the known mass number is mixed with a mobile phase solvent by using a liquid chromatograph feed pump. The internal standard sample is introduced into the mass spectrometer continuously or at a predetermined interval according to a pulse. Next, the mass spectrum derived from the internal standard sample can be referred to, and the mass calibration of the mass spectrum of a target component can be performed by an internal standard method.

WO 2016/103388 (PTL 2) describes that the mass calibration is performed by continuously adding a predetermined amount of a standard substance, the exact mass-to-charge ratio value of which is known and which is clearly not contained in a target sample, to eluate.

The method described in JP-A-2009-31201 (PTL 1) has a problem that, for example, the liquid chromatograph feed pump and a column become dirty and clogged by the standard sample such that the life of the column becomes shortened. The method described in WO 2016/103388 (PTL 2) requires a unit for continuously adding the standard sample. In order to implement this unit, it is required to provide a new mechanism for controlling a continuous operation, such as a liquid feed pump which is different from the liquid feed pump of the mobile phase solvent of the liquid chromatograph. Therefore, there is a problem that introduction cost of a device is increased by an amount of a newly added unit.

CITATION LIST

Patent Literature

PTL 1: JP-A-2009-31201
PTL 2: WO 2016/103388

SUMMARY OF INVENTION

Technical Problem

The present invention has been made in consideration of the above-described problems, and an object thereof is to provide a liquid chromatograph mass spectrometer that prevents contamination of a pump and a column and that can perform mass calibration without adding a complicated mechanism.

Solution to Problem

In order to solve the above-described problems, a liquid chromatograph mass spectrometer according to the present invention includes: a liquid chromatograph including a liquid feed pump configured to feed a mobile phase solvent; amass spectrometer configured to analyze a mass of a sample; and a standard sample container configured to be connected in series with the liquid chromatograph and the mass spectrometer in a flow path that connects the liquid chromatograph and the mass spectrometer, and configured to house a standard sample for mass calibration.

Advantageous Effects of Invention

According to the present invention, it is possible to provide a liquid chromatograph mass spectrometer that prevents contamination of a pump and a column caused by a standard sample and that can perform mass calibration without adding a complicated mechanism because the mass calibration can be performed by using a pump for feeding a mobile phase solvent of a liquid chromatograph.

BRIEF DESCRIPTION OF DRAWINGS

FIG. 1 is a schematic diagram illustrating a configuration example of a liquid chromatograph mass spectrometer according to a first embodiment.

FIG. 2 is a cross-sectional view illustrating an example of a configuration and operation of a standard sample container 14.

FIG. 3 is a cross-sectional view showing an example of a structure of a connector 35 attached to an injection hole H1 and a discharge hole H2 of the standard sample container 14.

FIG. 4 is a timing chart illustrating an operation relating to mass calibration in the liquid chromatograph mass spectrometer of FIG. 1.

FIG. 5 is a schematic diagram illustrating a configuration example of a liquid chromatograph mass spectrometer according to a second embodiment.

FIG. 6 is a timing chart illustrating operations of liquid chromatograph mass spectrometry, mass calibration, and flow path cleaning in a liquid chromatograph mass spectrometer of FIG. 5.

FIG. 7 is a schematic diagram showing a structure of a standard sample container 14 according to a third embodiment.

FIG. 8 is a timing chart illustrating liquid chromatograph mass spectrometry, mass calibration, flow path cleaning, and FIA operations in a liquid chromatograph mass spectrometer of FIG. 7.

FIG. 9 is a schematic diagram showing a structure of a standard sample container 14 according to a fourth embodiment.

FIG. 10 is a timing chart illustrating operations of liquid chromatograph mass spectrometry, mass calibration, and flow path cleaning in a liquid chromatograph mass spectrometer of FIG. 9.

FIG. 11 is a schematic diagram illustrating a configuration example of a liquid chromatograph mass spectrometer according to a fifth embodiment.

FIG. 12 is a timing chart illustrating an operation of a liquid chromatograph mass spectrometer of FIG. 11.

FIG. 13 is a schematic diagram illustrating a configuration example of a liquid chromatograph mass spectrometer according to a sixth embodiment.

DESCRIPTION OF EMBODIMENTS

Hereinafter, embodiments will be described with reference to the accompanying drawings. In the accompanying drawings, a functionally identical element may be represented by the same number or a corresponding number. While the accompanying drawings show embodiments and implementation examples based on a principle of the present disclosure, the drawings are provided for understanding of the present disclosure and are by no means used for limited interpretation of the present disclosure. Description of this specification is only a typical example, and does not limit the scope of the claims of the present disclosure or an application example thereof in any sense.

The embodiment is sufficiently described in detail for those skilled in the art to implement the present disclosure, and it is required to understand that other implementations and forms are can be performed, and that it is possible to change a configuration and structure and to replace various elements without departing from the scope and spirit of a technical idea of the present disclosure. Therefore, the following description should not be construed as being limited thereto.

First Embodiment

A configuration example of a liquid chromatograph mass spectrometer according to a first embodiment will be described with reference to a schematic diagram of FIG. 1. A liquid chromatograph mass spectrometer 100 is roughly formed of a liquid chromatograph 12 including a liquid feed pump 11 for feeding a mobile phase solvent 24, amass spectrometer 13, a standard sample container 14, and a pipe 15.

Although not shown in FIG. 1, the liquid chromatograph 12 includes a column or the like in addition to the liquid feed pump 11. The mass spectrometer 13 performs mass spectrometry of each component according to a component separated and introduced by the column by chromatography.

The pipe 15 allows the liquid chromatograph 12 and the mass spectrometer 13 to be connected to each other, and conveys a separated component of a measurement target sample from the liquid chromatograph 12 to the mass spectrometer 13. The standard sample container 14 is provided in the middle of a path of the pipe 15, and is disposed so as to be connectable in series with the liquid chromatograph 12 and the mass spectrometer 13. The standard sample container 14 is a container in which a standard sample solution for mass calibration is filled.

An example of a configuration of the standard sample container 14 will be described together with an operation thereof with reference to a cross-sectional view of FIG. 2. FIG. 2(a) shows an initial state of the standard sample container 14, and FIGS. 2(b) and 2(c) show how a standard sample solution 23 stored inside the standard sample container 14 is pushed out.

As an example, the standard sample container 14 is roughly formed of a case 21 and a partition plate 22. The case 21 has, for example, a tubular shape (for example, a cylindrical shape) in which a flow path direction is a longitudinal direction, and includes an injection hole H1 in a first wall surface 211 at one end thereof and a discharge hole H2 in a second wall surface 212 at the other end thereof. The partition plate 22 partitions the inside of the case 21 having the cylindrical shape in a direction intersecting a flow path, and is further disposed so as to be movable in the flow path direction (a direction connecting the injection hole H1 and the discharge hole H2). That is, in the standard sample container 14, the standard sample solution 23 is filled between the partition plate 22 and the second wall surface 212, and the mobile phase solvent 24 is injected into a location between the first wall surface 211 and the partition plate 22. As shown in FIGS. 2(b) and 2(c), the mobile phase solvent 24 is introduced from the injection hole H1 and the partition plate 22 is pushed, whereby the standard sample solution 23 is discharged from the discharge hole H2. A shape of the injection hole H1 and the discharge hole H2 can be, for example, about 1/16 inch in diameter, and can be formed in a shape to which a pipe tube and a screw of the liquid chromatograph can be connected.

The partition plate 22 is designed to move the inside of the case 21 in a direction from the injection hole H1 to the discharge hole H2 when a pressure of several tens of MPa is applied. For example, it is desirable that the standard sample solution 23 is a substance obtained in a manner that a substance in which a plurality of mass numbers of ion peaks appear, such as polypropylene glycol, cesium iodide, or the like, is dissolved in water and an organic solvent such as methanol/acetonitrile or the like. On the other hand, it is desirable that the mobile phase solvent 24 is water or the organic solvent such as methanol/acetonitrile or the like.

For example, a connector 35 as shown in a cross-sectional view of FIG. 3 is attached to the injection hole H1 and the discharge hole H2 of the standard sample container 14. The connector 35 includes a seal plug 31, a joint 32, a screw 33, and a tube 34. The tube 34 is attached to the injection hole H1 or the discharge hole H2, and one end on a side of the seal plug 31 of the joint 32 is connected to the above-described pipe 15.

The joint 32 is a cylindrical hollow member, and includes a hollow portion H3 along an axial direction of a cylinder. A screw hole is formed in an inner wall on one end side of the joint 32, and the seal plug 31 is screwed thereinto. A similar screw hole is formed in an inner wall on the other end side of the joint 32, and the screw 33 is screwed thereinto. The above-described pipe 15 is connected to one end of the joint 32 after the seal plug 31 is removed. Therefore, an inner diameter of one end of the joint 32 is configured to match an outer diameter of the pipe 15.

The screw 33 includes a through hole H4 along a central axis thereof, and the tube 34 is inserted into the through hole H4. When the screw 33 into which the tube 34 is inserted is connected to the joint 32 and the tube 34 is further fixed to the injection hole H1, the connector 35 can be connected to the standard sample container 14. In this manner, the standard sample container 14 can be connected to the pipe 15 by using the screw hole of the joint 32.

When the standard sample container 14 is carried, the seal plug 31 is connected to one end of the joint 32. The standard sample container 14 can be sealed with the seal plug 31 in a state where the inside of the standard sample container 14 is filled with the standard sample solution 23. In related art, the standard sample solution is left in an opened state, or it is required to repeatedly open and close a lid of a sample container after opening the lid thereof once such that the standard sample solution easily deteriorates. On the other hand, when the standard sample container 14 and the connector 35 of the first embodiment are used, the standard sample solution in a single-use amount can be sealed and stored, such that the deterioration in the standard sample solution can be prevented.

Next, with reference to a timing chart of FIG. 4, an operation related to the mass calibration in the liquid chromatograph mass spectrometer of FIG. 1 will be described. In the device of FIG. 1, when the mass calibration is started, the standard sample container 14 is connected to the pipe 15 (time t1). When the standard sample container 14 is connected thereto, the discharge hole H2 is connected to the mass spectrometer 13 via the connector 35, and the injection hole H1 is connected to the liquid feed pump 11 via the connector 35. In the standard sample container 14 at the start of the mass calibration, the partition plate 22 moves to a side of the injection hole H1 as shown in FIG. 2(a), and an internal space between the partition plate 22 and the discharge hole H2 is filled with the standard sample solution 23.

After the standard sample container 14 is connected to the liquid feed pump 11 and the mass spectrometer 13 via the pipe 15, liquid feed of the mobile phase solvent 24 from the liquid feed pump 11 starts. Since a pressure at the time of the liquid feed of the mobile phase solvent 24 is several tens of MPa, the partition plate 22 of the standard sample container 14 moves in the case 21 with the liquid feed thereof.

As the partition plate 22 moves, the standard sample solution 23 is pushed out of the discharge hole H2 and reaches the mass spectrometer 13 (refer to FIG. 2(b)). As shown in FIG. 4, while the standard sample container 14 is connected and the standard sample solution 23 is pushed out by action of the liquid feed pump 11, an ion signal of the standard sample solution 23 is detected with a constant intensity in the mass spectrometer 13. The mass calibration can be performed by correcting a horizontal axis of a mass spectrum based on a peak location of the ion signal of the standard sample solution 23 in a mass spectrum measurement result.

As shown in FIG. 2(c), when the partition plate 22 reaches the other end of the case 21, the ion signal of the standard sample solution 23 is not observed in the mass spectrometer 13. At this time, the case 21 is in a state of being filled with the mobile phase solvent 24. When the ion signal of the standard sample solution 23 is not observed in the mass spectrometer 13, the liquid feed pump 11 is stopped and the liquid feed of the mobile phase solvent 24 is stopped.

After that, the standard sample container 14 is removed from the pipe 15 (time t2 in FIG. 4), and for example, the liquid feed pump 11 and the mass spectrometer 13 are directly connected to each other by the pipe 15. When the mobile phase solvent 24 is fed again from the liquid feed pump 11 in this state, the standard sample solution 23 remaining in a flow path from the liquid feed pump 11 to the mass spectrometer 13 can be cleaned.

As described above, according to the configuration of the liquid chromatograph mass spectrometer of the first embodiment, as described in JP-A-2009-31201 (PTL 1), the standard sample solution does not pass through the liquid feed pump 11 of the liquid chromatograph 12. Therefore, it is possible to prevent the liquid feed pump 11 from being contaminated by the standard sample solution.

Since the liquid feed pump 11 of the liquid chromatograph 12 is used, the number of liquid feed pumps required to be operated as the liquid chromatograph mass spectrometer can be minimized.

Second Embodiment

Next, a liquid chromatograph mass spectrometer according to a second embodiment will be described with reference to FIGS. 5 and 6. FIG. 5 is a schematic diagram illustrating a configuration example of the liquid chromatograph mass spectrometer according to the second embodiment. In the liquid chromatograph mass spectrometer of the second embodiment, the liquid chromatograph 12 includes a column mounting portion 52 for mounting a column. In FIG. 5, the same members as those of the first embodiment will be denoted by the same reference signs as those of FIG. 1, and duplicated description thereof will be omitted below.

The column mounting portion 52 is configured to be capable of selectively mounting a column 51 which is used when liquid chromatograph mass spectrometry (LC/MS) is performed, and the standard sample container 14 which is used when the mass calibration is performed. The column 51 and the standard sample container 14 which are mounted on the column mounting portion 52 can be connected in series between the liquid feed pump 11 and the mass spectrometer 13 via the pipe 15, when the column 51 and the standard sample container 14 are respectively used.

As the standard sample container 14, the one shown in FIG. 2 can be adopted as an example. However, a volume of the case 21 of the standard sample container 14 is the same as a volume of the column 51 or a volume that can be housed in the column mounting portion 52. The column mounting portion 52 is usually kept at 40 to 70° C. In order to cope with such an environment, the case 21 may use a heat insulating material. By using the heat insulating material, it is possible to prevent the standard sample solution 23 in the standard sample container 14 from deteriorating by heat.

Next, an operation of the liquid chromatograph mass spectrometer of FIG. 5 will be described with reference to a timing chart of FIG. 6. FIG. 6 shows, as an example, a procedure in which the liquid chromatograph mass spectrometry (LC/MS), the mass calibration of the mass spectrometer 13, and the cleaning of the flow path are performed in order.

When the liquid chromatograph mass spectrometry (LC/MS) is performed, the column 51 is connected to the column mounting portion 52 (time t11 in FIG. 6). The column 51 is connected to the flow path from the liquid chromatograph 12 to the mass spectrometer 13 via the pipe 15. When the column 51 is connected thereto, several to several tens of μL of a sample to be analyzed is injected by a pump (not shown) and adsorbed in the column 51. Next, an appropriate mobile phase solvent is fed toward the column by the liquid feed pump 11. Accordingly, the sample to be analyzed is eluted from the column 51 and sent out to the mass spectrometer 13.

When the mass spectrometry is performed on the sample to be analyzed sent out therefrom with the mass spectrometer 13, for example, an ion signal of a measurement substance in the sample appearing in the chromatogram appears in a peak shape having a width of several seconds at any timing between time t11 and t12.

When the liquid chromatograph mass spectrometry is completed, the mass calibration continuously starts. In this case, the column 51 is removed from the column mounting portion 52, and the standard sample container 14 is connected thereto instead. A state of the ion signal at the time of the mass calibration, a processing method, and a state of the cross-sectional view of the standard sample container 14 are the same as those of the first embodiment.

When the partition plate 22 completely moves from the side of the injection hole H1 to the side of the discharge hole H2 inside the case 21, the ion signal does not appear in the mass spectrometer 13, such that the operation of the liquid feed pump 11 stops, and the liquid feed of the mobile phase solvent is completed. As described above, the mass calibration is completed.

When the mass calibration is completed, the process continuously proceeds to a flow path cleaning step. When the ion signal is not observed and the operation of the liquid feed pump 11 is stopped, continuously, the standard sample container 14 connected to the column mounting portion 52 is removed, and the column 51 is connected thereto instead. When the mobile phase solvent 24 is fed again from the liquid feed pump 11 in this state, the standard sample solution remaining in the flow path from the column mounting portion 52 to the mass spectrometer 13 can be cleaned. After cleaning the flow path, the sample is injected again and the liquid chromatograph mass spectrometry (LC/MS) is restarted in the same manner as described above.

As described above, in the device of the second embodiment, the column 51 is mounted on the column mounting portion 52 when the liquid chromatograph mass spectrometry (LC/MS) is performed, and when the mass calibration is performed, the standard sample container 14 is mounted on the column mounting portion 52 instead of the column 51. Therefore, according to the device of the second embodiment, in addition to obtaining an effect described in the first embodiment, it is possible to prevent the column 51 for the liquid chromatograph mass spectrometry from being contaminated by the standard sample solution. It is also possible to eliminate a possibility that the column 51 is clogged such that the life of the column 51 is shortened.

Third Embodiment

Next, a liquid chromatograph mass spectrometer according to a third embodiment will be described with reference to FIGS. 7 and 8. An overall configuration of the device of the third embodiment may be the same as the overall configuration of the device of the second embodiment (FIG. 5). However, in the third embodiment, a structure of the standard sample container 14 is different from that of the second embodiment.

FIG. 7 is a schematic diagram illustrating the structure of the standard sample container 14 according to the third embodiment. In FIG. 7, (a) shows a state in which the standard sample container 14 does not start to be used, (b) shows a state indicating a middle stage in which the standard sample container 14 is being used, and (c) shows a state indicating a stage in which the use of the standard sample container 14 is completed.

As an example, this standard sample container 14 is formed of the case 21 and a tube 71 extending inside the case 21, for example, in a spiral shape. The standard sample solution 23 is injected into the tube 71 at a stage before the mass calibration is performed. A diameter (a thickness) of the tube 71 is designed so that the standard sample solution 23 is not mixed with other solutions due to diffusion. A material of the tube 71 is selected so as to withstand several tens of MPa of pressure generated when the liquid feed is performed by the liquid chromatograph. As an example, characteristics of the tube 71 are an inner diameter of 0.25 to 1.00 mm, a length of 10 to 100 cm, and a PEEK tube as a material, and the tube 71 can be selected so that an inside thereof can be filled with tens to hundreds of μL of the standard sample solution 23.

The tube 71 is formed in the spiral shape in order to be able to store the standard sample solution 23 in the amount required for performing the mass calibration. In FIG. 7, a spiral is drawn so as to draw a large number of loops centered on a direction intersecting the flow path (a direction perpendicular to a paper surface), and the spiral shape is not limited to that shown in FIG. 7. For example, a direction of the loop may be centered on a direction parallel to the flow path (a direction of the paper surface). Disposition itself of the spiral shape of the tube 71 is also an example, and is not limited to the spiral shape. For example, instead of having the spiral shape, the tube 71 may have at least one folded portion in the case 21, such as a shape in which the tube 71 is disposed in a zigzag shape or the like.

The tube 71 is connected between the injection hole H1 and the discharge hole H2. The tube 71 is pulled out from the injection hole H1 and the discharge hole H2 and connected to the pipe 15. The same connector 35 as that of the first embodiment may be disposed in the injection hole H1 and the discharge hole H2, and the tube 71 and the pipe 15 may be connected to each other via the connector 35. However, even though the connector 35 is not provided by allowing the tube 71 to have an appropriate cross-sectional diameter and to be formed in the spiral shape, leakage of the standard sample solution 23 to an outside of the tube 71 is prevented.

The standard sample container 14 of the third embodiment is different from that of the first embodiment in that the partition plate 22 is not provided, and the standard sample solution 23 in the tube 71 receives direct pressure from the mobile phase solvent injected from one end of the tube 71 and is discharged from the other end thereof. The shape of the standard sample container 14 is substantially symmetrical, which is different from that of the first embodiment. Therefore, in the third embodiment, the structure of FIG. 7 may be reversed, the discharge hole H2 may be connected to a side of the liquid chromatograph 12, and the injection hole H1 may be connected to a side of the mass spectrometer 13. As will be described later, the cleaning of the flow path can also be performed while the standard sample container 14 is still connected to the flow path.

Next, an operation of the liquid chromatograph mass spectrometer of FIG. 7 will be described with reference to a timing chart of FIG. 8. FIG. 8 shows, as an example, a procedure in which the liquid chromatograph mass spectrometry (LC/MS), the mass calibration of the mass spectrometer 13, the cleaning of the flow path, and a Flow Injection Analysis (FIA) method are performed in order.

Since the liquid chromatograph mass spectrometry (LC/MS) can be performed in almost the same manner as that of the second embodiment (FIG. 6), duplicate description thereof will be omitted. The mass calibration to be performed next is also performed by allowing the standard sample container 14 to be connected to the column mounting portion 52, in the same manner as that of the second embodiment. The connection method is also the same as that of the second embodiment.

When the mass calibration is performed, the standard sample container 14 is connected to the column mounting portion 52 and connected to the pipe 15, and then the mobile phase solvent 24 is fed from the liquid feed pump 11 toward the standard sample container 14. Next, as shown in FIG. 7(b), the mobile phase solvent 24 pushes the standard sample solution 23 in the tube 71 out toward the discharge hole H2, and the standard sample solution 23 flows toward the mass spectrometer 13.

On the assumption that a flow rate is several to several tens of μL/min, the mass spectrometer 13 can observe the ion signal of the standard sample solution for about 10 minutes (time t22 to t23) with a stable intensity. A measurement result of the standard sample solution 23 is displayed as a mass spectrum on a display device (not shown) of the mass spectrometer 13, and the mass calibration can be performed by correcting the horizontal axis of the mass spectrum based on this ion peak location.

When the mass calibration is completed, the process proceeds to the flow path cleaning step in the same manner as that of the second embodiment. However, in the third embodiment, after the mass calibration is completed, in a state where the standard sample container 14 is still mounted on the column mounting portion 52, the cleaning step can be performed by using the tube 71 as the flow path. In this point, the second embodiment is different from the third embodiment in that after the mass calibration is completed, the standard sample container 14 is replaced with the column 51 and the cleaning step is performed. The standard sample container 14 of the third embodiment is different from the standard sample container 14 of the first embodiment in that the partition plate 22 is not provided, and even after the standard sample solution 23 is discharged, the flow path of the tube 71 is open, and an inside of the tube 71 is filled with the mobile phase solution. Therefore, the cleaning of the flow path can be performed by continuously using the standard sample container 14 without replacing the standard sample container 14 with the column 51.

When the cleaning step is completed, any sample can be continuously analyzed by the Flow Injection Analysis (FIA) method using the tube 71 of the standard sample container 14. The FIA method is a method for performing the liquid chromatograph mass spectrometry without performing component separation by the column 51. Since the measurement can be performed quickly without using the column 51, a parameter of the measurement of the liquid chromatograph mass spectrometry can be optimized.

In the analysis by the FIA method, in a state where the standard sample container 14 is connected to the column mounting portion 52, several to several tens of μL of any sample is injected while the appropriate mobile phase solvent is fed from the liquid feed pump 11. Since the sample to be analyzed is slightly diffused until the sample to be analyzed reaches the mass spectrometer 13, a peak width of the ion signal in the chromatogram is slightly wider than that of a case where the sample to be analyzed passes through the column 51. After the analysis by the FIA method is completed, the standard sample container 14 is removed from the column mounting portion 52, the column 51 is connected thereto instead, and the liquid chromatograph mass spectrometry is performed again.

As described above, according to the standard sample container 14 of the third embodiment, since the tube 71 of the standard sample container 14 can be continuously used as the flow path to be cleaned after the mass calibration is completed, a deterioration level of the column 51 can be reduced as compared with the above-described embodiment in which the cleaning is performed through the column 51.

Fourth Embodiment

Next, a liquid chromatograph mass spectrometer according to a fourth embodiment will be described with reference to FIGS. 9 and 10. An overall configuration of the device of the fourth embodiment may be the same as the overall configuration of the device of the second embodiment (FIG. 5). However, a structure of the standard sample container 14 of the fourth embodiment is different from that of the second embodiment.

FIG. 9 is a schematic diagram illustrating the structure of the standard sample container 14 according to the fourth embodiment. The standard sample container 14 is formed of the case 21 and a filler 41 that is filled in the case 21 and can absorb the standard sample solution 23. The filler 41 is filled in a cavity of the case 21. The injection hole H1 and the discharge hole H2 provided at opposite ends of the case 21 can be configured to be connectable to the same connector (FIG. 3) as that of the above-described embodiment.

A material of the filler 41 may be the same as that of a filler to be filled in the column 51, such as silica gel or the like. However, the standard sample container 14 in the fourth embodiment is dedicated to the mass calibration, and is a container different from the column 51 to be used for the liquid chromatograph mass spectrometry.

Next, an operation of the liquid chromatograph mass spectrometer of FIG. 9 will be described with reference to a timing chart of FIG. 10. FIG. 10 shows, as an example, a procedure in which the liquid chromatograph mass spectrometry (LC/MS), the mass calibration of the mass spectrometer 13, and the cleaning of the flow path are performed in order. During the liquid chromatograph mass spectrometry (LC/MS), the mass calibration, and the cleaning of the flow path, a connection state of the column 51 and the standard sample container 14 to the column mounting portion 52, and a sample injection operation are the same as those of the third embodiment. Therefore, duplicate description thereof will be omitted below. However, the ion signal obtained during the mass calibration is different from that of the third embodiment, and becomes a chromatogram with a peak shape such as a mountain having a wide width.

In the fourth embodiment, the standard sample container 14 includes the filler 41 at the inside thereof, and the standard sample solution 23 is housed at the inside of the standard sample container 14 in a form of being absorbed by the filler 41. Since the filler 41 has high absorbency, the standard sample solution 23 of contents does not leak even in a state where the seal plug 31 of the connector 35 is loose. Therefore, the work of connecting the standard sample container 14 to the column mounting portion 52 becomes easier than that of the above-described embodiments.

Fifth Embodiment

Continuously, a liquid chromatograph mass spectrometer according to a fifth embodiment will be described with reference to FIGS. 11 and 12. FIG. 11 is a schematic diagram illustrating a structure of the liquid chromatograph mass spectrometer according to the fifth embodiment. In the device of the fifth embodiment, the column mounting portion 52 is configured to be capable of mounting the column 51 for the liquid chromatograph mass spectrometry and the standard sample container 14 for the mass calibration in parallel to each other at the same time.

A valve 111a is provided between the liquid feed pump 11 and the column mounting portion 52 so that the column 51 and the standard sample container 14 can be selectively used. A valve 111b is provided between the column mounting portion 52 and the mass spectrometer 13. The column 51 and the standard sample container 14 are connected in parallel between the valve 111a and the valve 111b. A solution flowing through the column 51 or the standard sample container 14 is introduced into the mass spectrometer 13 via the valve 111b. The valves 111a and 111b are configured to selectively connect either one of the column 51 and the standard sample container 14 to the flow path. A plurality of columns 51 and a plurality of standard sample containers 14 may be connected to one column mounting portion 52.

Next, an operation of the liquid chromatograph mass spectrometer of FIG. 11 will be described with reference to a timing chart of FIG. 12. FIG. 12 shows, as an example, a procedure in which the liquid chromatograph mass spectrometry (LC/MS), the mass calibration of the mass spectrometer 13, the cleaning of the flow path, and the Flow Injection Analysis (FIA) method are performed in order.

Since the liquid chromatography mass spectrometry (time t41 to t42 in FIG. 12) can be performed in almost the same manner as that of the second embodiment (FIG. 6), duplicate description thereof will be omitted. The mass calibration (time t42 to t43) to be performed next is also performed by connecting the standard sample container 14 to the column mounting portion 52, in the same manner as that of the second embodiment. However, in an operation example of FIG. 12, the column 51 is in a state of being always connected (mounted on) to the column mounting portion 52 even when the mass calibration is performed. The standard sample container 14 is also in a state of being always connected to the column mounting portion 52 when the column 51 is used. However, when the mass calibration starts (for example, time t42), the new standard sample container 14 filled with the standard sample is replaced with the old standard sample container 14 that is already used. As described above, both the column 51 and the standard sample container 14 are always mounted on the column mounting portion 52, and only one of the column 51 and the standard sample container 14 is selectively connected to the valves 111a and 111b. Since the cleaning and the operation in the FIA are almost the same as those of the third embodiment, duplicate description thereof will be omitted.

As described above, in the fifth embodiment, the column mounting portion 52 can be maintained in a state where the column 51 and the standard sample container 14 are provided in parallel to each other and are simultaneously mounted on the column mounting portion 52. Since the column 51 can be left connected to the column mounting portion 52, the column 51 can always be maintained in a warm state in the column mounting portion 52.

Sixth Embodiment

Continuously, a liquid chromatograph mass spectrometer according to a sixth embodiment will be described with reference to FIG. 13. FIG. 13 is a schematic diagram illustrating a structure of the liquid chromatograph mass spectrometer according to the sixth embodiment. In the device of the sixth embodiment, in the same manner as that of the fifth embodiment, the column mounting unit 52 is configured to be capable of mounting the column for the liquid chromatograph mass spectrometry and the standard sample container for the mass calibration in parallel at the same time. In the sixth embodiment, a plurality of standard sample containers 14a and 14b can be mounted on one column mounting portion 52.

The standard sample containers 14a and 14b are containers for storing standard samples having different properties from each other. For example, the standard sample container 14a can store a low molecular weight sample, and the standard sample container 14b can store a high molecular weight sample. The standard sample containers 14a and 14b are selected according to the properties of the samples that are routinely targets to be analyzed in the liquid chromatograph mass spectrometry. For example, when the low molecular weight sample is routinely used as a target for the liquid chromatograph mass spectrometry, basically, the mass calibration is performed by using a low molecular weight standard sample solution in the standard sample container 14a. The mass calibration using a high molecular weight standard sample solution in the standard sample container 14b is performed when the high molecular weight sample whose use frequency is low is used as a target for the liquid chromatograph mass spectrometry.

Accordingly, in the sixth embodiment, two types of standard sample solutions stored in the standard sample containers 14a and 14b can be used appropriately according to the properties of the sample to be subjected to the liquid chromatograph mass spectrometry. Accordingly, the process of the mass calibration can be completed in a shorter time than when the mass calibration is performed in all the molecular weight regions. Cost can also be reduced as compared with the standard sample solution covering all molecular weights.

[Others]

The present invention is not limited to the above-described embodiments, and includes various modifications. For example, the embodiments are described in detail in order to describe the present invention in an easy-to-understand manner, and are not necessarily limited to the one including all the configurations described above. A part of the configuration of one embodiment can be replaced by a configuration of another embodiment, and the configuration of another embodiment can be added to the configuration of one embodiment. It is possible to add, delete, and replace another configuration with respect to a part of the configuration of each embodiment.

REFERENCE SIGNS LIST 11 liquid feed pump
12 liquid chromatograph
13 mass spectrometer
14 standard sample container
15 pipe
21 case
22 partition plate
23 standard sample solution
24 mobile phase solvent
31 seal plug
32 joint
33 screw
34 tube
35 connector
41 filler
51 column
52 column mounting portion
71 tube
111 valve

The invention claimed is:

1. A liquid chromatograph mass spectrometer, comprising:
 a liquid chromatograph including a liquid feed pump configured to feed a mobile phase solvent;
 a mass spectrometer configured to analyze a mass of a sample; and
 a standard sample container configured to be installed in a flow path connecting the liquid chromatograph and the mass spectrometer, configured to be connected in series with the liquid chromatograph and the mass spectrometer, and configured to house a standard sample for mass calibration.

2. The liquid chromatograph mass spectrometer according to claim 1, wherein the standard sample container includes:
 a cylindrical case that includes an injection hole at a first end and a discharge hole at a second end and that has a flow path direction as a longitudinal direction, and
 a partition plate configured to be movable along an inner wall of the case and partitioning an inside of the case, and wherein
 the partition plate is configured to be movable in a direction of the discharge hole due to movement of a mobile phase solution from the injection hole.

3. The liquid chromatograph mass spectrometer according to claim 1, wherein the standard sample container includes:
 a case that includes an injection hole at a first end and a discharge hole at a second end, and
 a tube connected between the injection hole and the discharge hole in the case and including at least one folded portion in the case.

4. The liquid chromatograph mass spectrometer according to claim 3, wherein the tube is arranged in a spiral shape in the case.

5. The liquid chromatograph mass spectrometer according to claim 1, wherein the standard sample container includes:
 a case that includes an injection hole at a first end and a discharge hole at a second end, and
 a filler filled in the case and capable of absorbing standard sample solution.

6. The liquid chromatograph mass spectrometer according to claim 1, further comprising:
 a column mounting portion configured to be capable of mounting the standard sample container.

7. The liquid chromatograph mass spectrometer according to claim 6, wherein
 the column mounting portion is configured to be capable of mounting the standard sample container and a column used for liquid chromatograph mass spectrometry in parallel, and wherein
 the liquid chromatograph mass spectrometer further includes a valve configured to selectively connect the standard sample container or the column to a flow path.

8. The liquid chromatograph mass spectrometer according to claim 6, wherein
 the column mounting portion is configured to be capable of mounting a plurality of standard sample containers that respectively house standard sample solutions having different properties.

* * * * *